United States Patent

[11] 3,523,562

| [72] | Inventor | Edward G. Haupricht<br>4330 Hill Ave., Toledo, Ohio 43607 |
|---|---|---|
| [21] | Appl. No. | 650,076 |
| [22] | Filed | June 29, 1967 |
| [45] | Patented | Aug. 11, 1970 |

[54] MATERIAL HANDLING APPARATUS
45 Claims, 6 Drawing Figs.

[52] U.S. Cl. .................................................. 141/80,
141/125, 134; 222/252, 415; 198/102;
214/522; 241/101
[51] Int. Cl. ...................................................... B65b 1/24
[50] Field of Search .......................................... 141/80,
131, 132, 133, 134; 198/56, 57,
102, 214/46, 519, 520, 521, 522,
Inquired Cl 259;/Inquired Cl 53;
241/100, 101, 186; 222/227, 252, 254, 415;
141/125

[56] References Cited
UNITED STATES PATENTS
2,265,702  12/1941  Sime............................  141/134

*Primary Examiner*— Houston S. Bell, Jr.
*Attorney*— Myron E. Click

ABSTRACT: The material handling apparatus disclosed herein is particularly useful for uniformly delivering compactable, discrete material. The apparatus includes a receiver, material processing equipment, and means for dispensing or loading the material into containers. The receiver includes a bulk storage means which has a live floor and end barrier means which cooperate to uniformly feed material through a discharge port. The material may be processed further to remove lumps and to shred the material before loading. The loading equipment includes means for feeding containers past a loading station, means for returning excess material to the bulk storage area and means for continually feeding containers for filling.

INVENTOR.
EDWARD G. HAUPRICHT
BY Myron E. Ceick
ATTORNEY

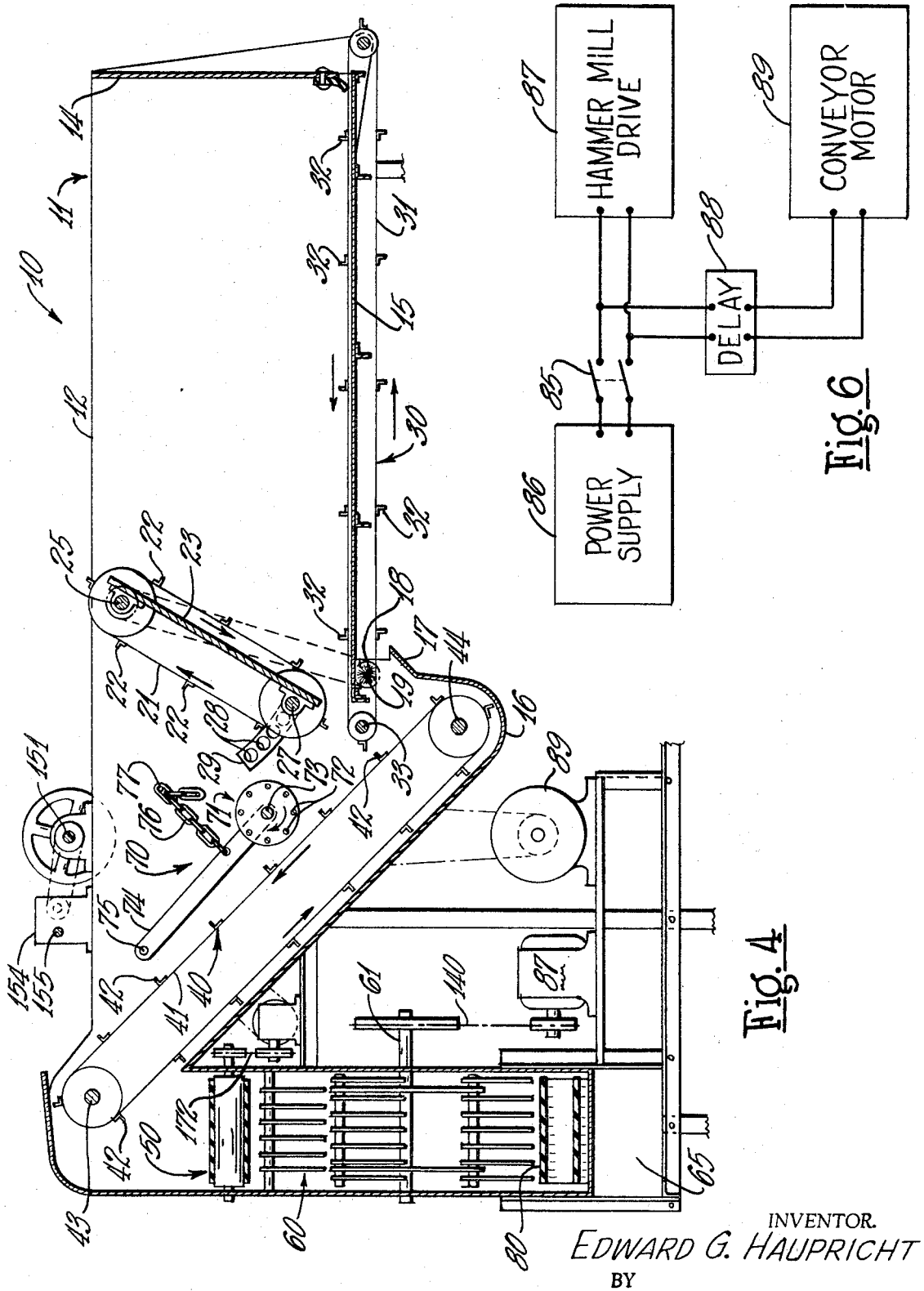

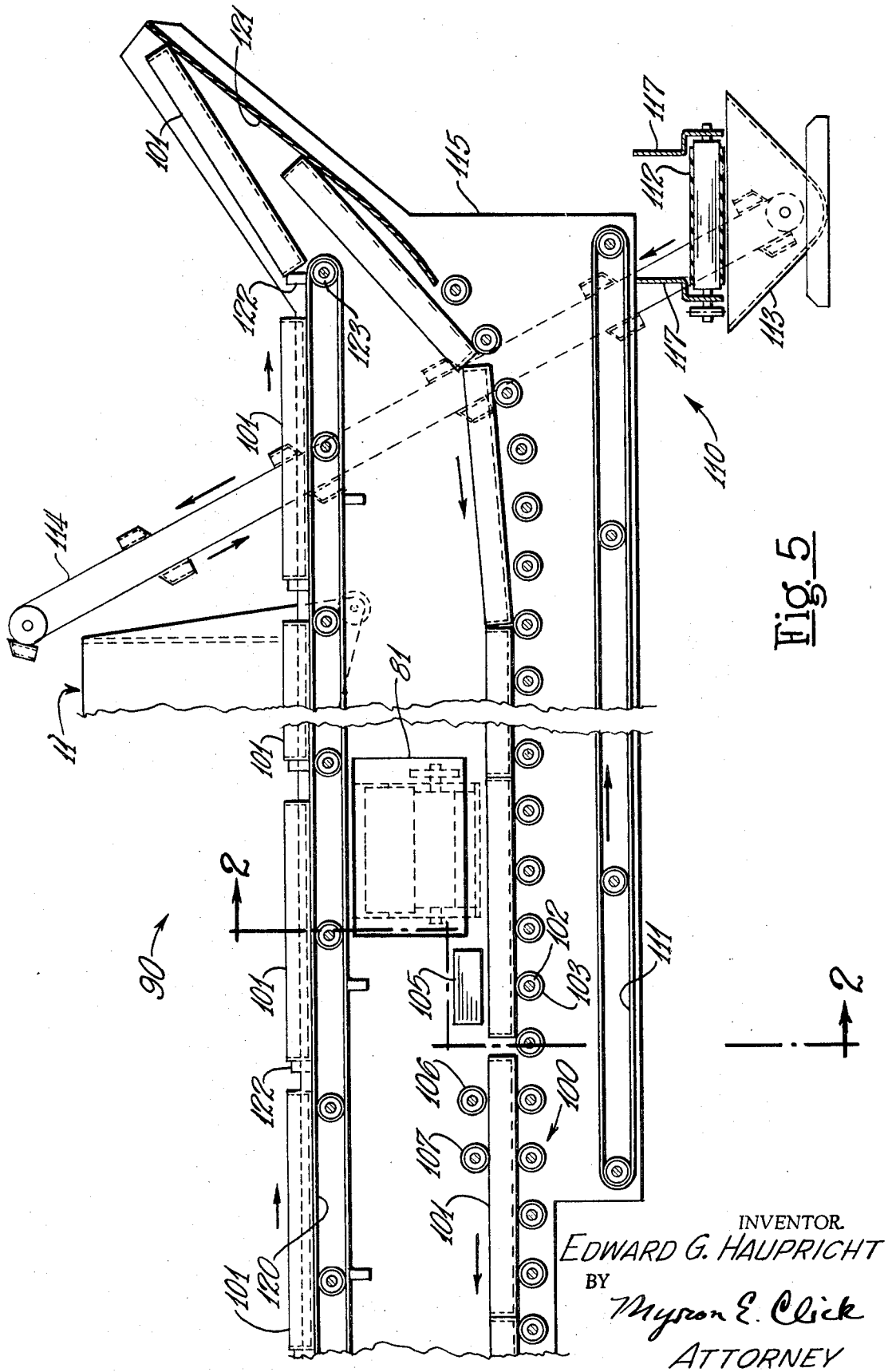

MATERIAL HANDLING APPARATUS

The invention relates to apparatus generally as described above and is particularly concerned with the provision of apparatus for establishing a smooth, uniform flow of compactable material to a point of distribution, and distributing the material into containers in a particular fashion. The device may act in the nature of a surge tank in a feed line between a point of supply and a point of use so that granular or other similar discrete material which may have a tendency to accumulate into bunches or clumps of varying density, thickness and composition may be delivered to the point of distribution in a uniform and homogenous condition.

Although the apparatus as a whole has application in other areas it is described herein as applied to soil handling problems in filling containers or flats with a prepared soil for growing seedlings in the flats or containers. Individual sections of the entire device are also considered novel and have applications in this apparatus as a part of the combination as well as individual application elsewhere in industry.

When labor was plentiful and skilled in the art of preparing soil for use in flats or containers to obtain the best plant growth, the mixing of the soil to obtain the proper uniformity and the filling of the containers to the proper level and density was accomplished by hand. However, the continual reduction in availability of such skilled labor along with the competitive requirements in costs and for mass production has produced a situation which can be solved by machine processing.

Accordingly, it is an object of this invention to provide apparatus for establishing a smooth, uniform flow of compactable material to a point of use or distribution.

It is a further object of this invention to provide apparatus which will act in the nature of a surge tank in a feed line between a point of supply and a point of use, so that granular or other similar discrete material which may have a tendency to accumulate into clumps of varying density, thickness and composition may be delivered to the point of use in a uniform and homogenous condition.

It is a further object of this invention to provide apparatus operable by a single operator which will distribute or load materials to a uniform depth and density in containers while returning excess material to storage.

A still further object of this invention is to provide a receiver which may establish a uniform flow of the above-described materials.

Another object of this invention is to provide processing means between a receiver or other apparatus and a point of distribution for restoring stored material to a uniform and homogenous condition.

Still another object of this invention is to provide loading or distributing means for filling containers to a desired density and depth which may be supervised by a single operator.

A still further object of this invention is to provide work-piece handling means in which a single operator may both feed and remove work-pieces that are individually supplied and removed, before and after an operation is performed thereon at a process station.

Apparatus for carrying out the above objects includes a receiver including floor means and end barrier means. The floor means and end barrier means define a discharge port for the receiver adjacent the bottom of the end barrier means. The floor means includes means for urging material in the receiver toward the end barrier means and the discharge port. The end barrier means is disposed at a pitch angle substantially corresponding to the angle of repose of material in the receiver. The end barrier means includes agitator means having elements projecting outwardly toward the material in the receiver to engage a surface of the material and means for moving the elements with respect to the surface of the material.

The agitator elements may be carried by endless traveler means arranged to continuously move the elements in a path along the pitch angle in engagement with the material in the receiver. The traveler means may be endless chains and the elements may be scrapers mounted on the chains. The end barrier means advantageously includes barricade means mounted behind the agitator elements to prevent the material in the receiver from falling out of the receiver between the endless chains and the elements.

The material urging means of the floor means may comprise an endless belt conveyor means. The floor means may alternatively include a deck or apron and conveyor means comprising endless chains having their active runs mounted for movement above the deck, the chains carrying spaced means for engaging the undersurface of the material in the receiver.

Hopper means may be disposed to receive material from the discharge port, the material urging means traveling through the discharge port and above the hopper means. Means are advantageously provided for removing or cleaning material clinging to the material urging means for deposit in the hopper means.

The end barrier means is advantageously pivotally mounted at one end thereof. Means may be provided for removably securing the other end in preselected positions whereby the pitch angle of the end barrier means may be adjusted to substantially correspond with the angle of repose of a particular material in the receiver.

Hopper means may be disposed to receive material from the discharge port of the receiver means, shredding means may be supplied to reprocess or rework the material, and means are provided for delivering material from the hopper means to the shredding means. The hopper to shredder delivery means may include conveyor means having one end disposed to pick up material from the hopper means or the discharge port and the other end disposed to deliver the material to and preferably above the shredder means. The hopper to shredder conveyor may include endless belt means carrying spaced and transversely mounted material pick up means for retaining measured amounts of material on the belt means as it leaves the hopper means or discharge port. The delivery means may further include leveling means disposed a predetermined distance above the hopper to shredder conveyor means to insure that no more than a predetermined or measured amount is carried by the conveyor means. The leveling means may be a rotatable drum means disposed transversely to and a predetermined distance above the hopper to shredder conveyor means to crush compacted lumps of material carried on the conveyor means. The hopper to shredder conveyor means may be inclined upwardly from the hopper means, the pitch of the conveyor combining with the action of the rotatable drum means so that crushing of a compacted lump of material results in the removal of excess material from the conveyor means by gravity.

The drum means may advantageously be mounted on and freely rotatable on a drum shaft, the drum shaft being journally supported at each end in a pivotally mounted arm so that the passage of an uncrushable object beneath the drum will merely urge the drum means away from the conveyor means by the pivoting action of the arms. The pivotable arms and the drum means are preferably yieldingly suspended selected distances above the hopper to shredder conveyor means so that the uncrushable objects may push the drum means away from the conveyor means, but the suspension means will not allow the drum means closer than the selected distance to crush lumps of a predetermined size. The drum means comprises preferably a plurality of circumferentially spaced members defining a substantially cylindrical shape, the spacing between the members enabling the drum means to retain a compacted lump for crushing.

Means such as a conveyor or a chute may be disposed transverse to the shredder end of the hopper to shredder conveyor to divert material received from the conveyor to a selected dumping locating above the shredder means.

In order to enable the shredding or hammer mill means to be in full operation before material is dumped thereon, there is provided first means for driving the shredding means, second means for driving the material moving portion of the apparatus, and starting means for the first and second driving means. Means are provided for delaying the starting of the second driving means until the first driving means is in full operation. The driving means discussed above may include individual motor means or may include clutch and gear box arrangements for respectively driving the shredding means and the material moving portions of the apparatus, or other means to carry out the functions described above. If the driving means is electrical motor means then an electrical delay circuit may be connected to a starting switch to insure that the first motor starts, and is in full operation, before the second motor starts. Similarly, a provision for delaying the engagement of a clutch to start driving the material moving portions of the apparatus from a gear box or housing will provide the same function.

Means are also disclosed herein for loading or distributing the material in which a loading station means comprises a material-container conveyor adapted to convey containers past a loading station to receive material. The rate of movement of the container past the loading station relative to the volume of the material delivered to the station is such that material in excess of the capacity of each container is delivered to each container. Means spaced above the container conveyor remove a predetermined amount of the excess over-fill.

Means are provided for catching the removed over-fill and returning the over-fill to the receiver or storage point. The catching and returning means may include over-fill material conveyor means disposed beneath the loading station, the container conveyor in this instance preferably comprising spaced driven rollers to permit excess over-fill to fall therebetween onto said over-fill conveyor means. Wall means adjacent the container conveyor are advantageously provided to direct the fall of the excess over-fill onto the over-fill conveyor. Means may be provided for maintaining a space between the wall means and a container on the container conveyor to provide a space to permit the fall of excess over-fill onto the over-fill conveyor.

The loading and distributing means may include means for compressing the material remaining in the container after the over-fill is removed. The compressing means may include one or more roller means spaced at predetemined distances above the conveyor. If more than one compression roller means is provided the successive roller means are spaced closer and closer to the contaner to provide successive compacting. As noted above the container conveyor advantageously comprises a plurality of driven rollers, each roller having a surface adapted to frictionally engage a container bottom for movement of a container along the conveyor to prevent crushing of the containers if jammed.

The apparatus described above may further include means for feeding containers to the container conveyor which comprises a feed conveyor disposed above the container conveyor. Means inclined upwardly away and spaced from the end of the feed conveyor a distance less than one-half the length of the container are provided, the inclined means extending beneath the feed conveyor and adapted to direct containers coming down the inclined means onto the container conveyor. Means attached to the feed conveyor urge the leading edge of the container up the inclined means until the trailing edge of the container falls from the feed conveyor onto the inclined means.

Apparatus of the character just described is applicable in other circumstances as a work-piece conveyor adapted to convey work-pieces past a process station for an operation at the station. Work-piece feed conveyor means disposed above the work-piece conveyor means cooperate with upwardly inclined means spaced from the end of the feed conveyor a distance less than one-half the length of a work-piece, the inclined means extending beneath the feed conveyor and adapted to direct work-pieces coming down the inclined means onto the work-piece conveyor. Again, means are attached to the feed conveyor for urging the leading edge of a work-piece up the inclined means until the trailing edge of the work-piece drops onto the inclined means directing the work-piece onto the work-piece conveyor means. This apparatus requires only one operator at the process station to provide work-pieces to receive the operation and to remove work-pieces after the operation is accomplished.

If the receiver disclosed herein is utilized with a very heavy material such as potting soil a tremendous amount of force is required to drive the material urging means since it is situated beneath the full weight of the material in the receiver. This driving means advantageously comprises a power shaft connected to drive the material urging means, rachet wheel means mounted to drive the power shaft, pawl means for rotating the ratchet wheel means, a lever system for reciprocating the pawl which may include a stroke length lever-fulcrum arrangement, the fulcrum being movable along said lever to adjust the length of the reciprocating stroke applied to the pawl means, and means for applying force to the lever system. The lever system may include bell crank means connected in a linkage between the stroke length lever and the pawl means to increase the force applied to the pawl means. So that the lever system may be driven by the same rotary mechanism that is driving the various conveyor means illustrated herein pitman rod means is provided for translating rotary motion derived from a motor into reciprocating motion to be applied to the lever system.

Other objects, advantages, and features will become apparent when the following description is taken in conjunction with the accompanying drawings, in which:

FIGURE 4 is a sectional view of the apparatus of FIGURE 1 taken along lines 4-4 of FIGURE 2;

FIGURE 5 is a sectional view of loading or distributing apparatus embodying the teachings of this invention taken along lines 5-5 of FIGURE 2, the loading apparatus of FIGURE 5 being omitted from FIGURES 1, 3, and 4 to more clearly show certain portions of the invention; and FIGURE 6 is a schematic circuit diagram illustrating the electrical power application for the invention.

Figure 1:
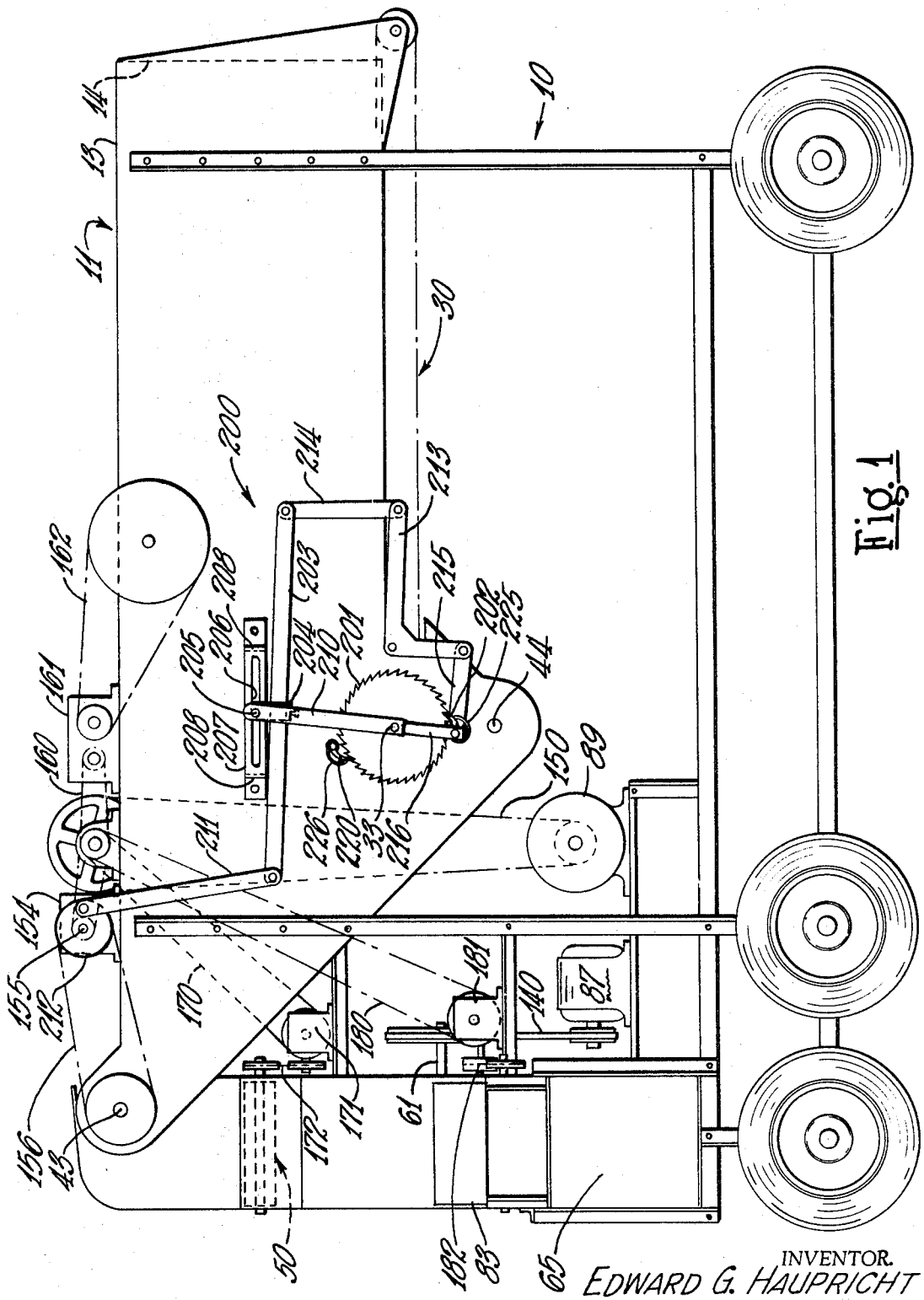
FIGURE 1 is a side elevational view of apparatus embodying the teachings of this invention.

Referring to the drawings and particularly to FIGURES 1, 2, 3 and 4, the reference numeral 10 indicates generally apparatus embodying the teachings of this invention while reference numeral 11 indicates generally a receiver comprising a rear end wall 14 and upstanding side walls 12 and 13. Material urging means, such as conveyor means indicated generally by the reference numeral 30, cooperates with a deck or apron 15 to comprise a floor means for the receiver.

The conveyor means 30 as shown in the drawings comprises endless chains 31 having transversely mounted material moving elements or scrapers 32. The active run of the conveyor 30 and the chains 31 move just above the apron or deck 15 to engage the undersurface of material in the receiver 11. While the endless chain-scraper-deck combination is shown as a preferred embodiment it is to be understood that it is the equivalent of a floor means in which an endless belt, with or without material engaging elements transversely mounted thereon, constitutes the floor of the receiver and is operative to urge the material toward the end barrier means indicated generally at 20.

The end barrier means 20 comprises, in the instance shown, a pair of endless chains 21 having a plurality of elements 22 projecting outwardly towards material in the receiver 11 mounted on the chains 21. A barricade means 23 is mounted behind the chains 21 and prevents material in the receiver from falling out of the receiver between the chains 21 and elements 22. Again, it is to be understood that an endless belt having agitator elements thereon may be utilized as an equivalent to the preferred embodiments shown herein, the use of an endless belt doing away with the necessity for the use of a barricade means such as 23 behind the agitator elements.

The material urging means 30 has a power shaft 33 journally supported in the frame or side walls of the apparatus to drive chains 31 and an idler shaft 34 also journally supported in extensions of the side wall or frame of the apparatus. Similarly, the end barrier means 20 has a power shaft 25 journally supported in the frame or side walls of the apparatus to drive chains 21 and an idler shaft 27. The idler shaft 27 may have extensions to be selectively moved inwardly and outwardly for journally supporting the idler shaft 27 in a selected one of the apertures 28 formed in side wall plates 29 so that the end barrier means may be pivotally moved about shaft 25 to adjust the pitch angle of the end barrier means 20.

The device of the present disclosure is intended primarily for handling potting or other soils or the like but it may be advantageously used with any materials which have a tendency to compact when subjected to pressure usually resulting during storage. When any such material is delivered to a receiver at a closely localized point, it tends to pile into a cone whose lateral surfaces are inclined from the vertical at an angle which depends upon the character of the material. In a situation like that illustrated, of course, the material will tend to build vertically against the side walls and against the rear wall. In order to provide a smooth, uniform flow of the compactable material in the receiver the end barrier means is made adjustable so that it may be disposed at a pitch angle substantially corresponding to the angle of repose of the material in the receiver. Thus, the agitator elements projecting outwardly toward the material on the material side may engage substantially all of the surface of the material and cause a uniform feed in cooperation with the material urging means. Not only does the disposition or pitch angle so selected enable the uniform feed but, in engaging the entire surface by the agitator elements, assistance is provided in breaking up clumps of the material while still in the receiver.

The end barrier means 20 cooperates with the floor means including the deck 15 and the material urging means 30 define a discharge port for the receiver adjacent the bottom of the end barrier means. The endless chains 21 preferably rotate in the direction of the arrows shown in FIGURE 4.

Brush, cleaner or material removing means 18 mounted on power shaft 19 is disposed beneath the deck 15 but above a hopper 17 to remove material from the endless chains 31 supporting the scraper elements 32 to prevent loss of the material and to permit the area to remain clean. The brush 18-shaft 19 assembly or combination is illustrative of other dispositions of this or equivalent cleaning means for removing material still clinging to the material urging means. That is, the brush 18 may be disposed beneath the conveyor or endless chains 31 to remove material from both the scrapers 32 and the chains 31. Two brushes as just described may be utilized in combination. If the conveyor means is an endless belt means constituting the floor means then the brush or other cleaning means would obviously be located beneath the belt means or on the outside of the loop.

After the material in the receiver 11 issues from the discharge port, a chute or hopper 17 may be provided to receive the material. In the distribution of material such as potting soil it is advantageous to rework the soil to provide the density and uniformity required or desired. Thus, a shredder means, indicated generally at 60 is so provided.

Although the material from the receiver may be directly fed to the shredder means 60 it is advantageous to further process the material and to insure that uniform or measured amounts are delivered to the shredder over a period of time. Therefore, a hopper to shredder delivery means such as the conveyor indicated generally at 40 is provided.

The conveyor 40 may comprise an endless belt 41 having material pickup elements such as transversely mounted bars 42 attached thereto for picking up measured amounts from the bottom 16 of the chute or hopper 17. Leveling apparatus indicated generally at 70 is provided to further insure that a measured amount is carried by the conveyor means 40. The conveyor means 40 has a power shaft 43 and an idler shaft 44, both journally supported in the frame or side walls of the apparatus.

While the conveyor in some instances may be mounted horizontally to dispense the material in measured amounts to the shredder 60 the upward inclination of the conveyor cooperates with the leveler 70 to insure that excess amounts of the material will be returned to the bottom 16 of the hopper 17 by gravity for subsequent pick up.

The leveling device 70 is advantageously a drum means 71 preferably made up of a plurality of circumferentially spaced members 72 which define a substantially cylindrical form or shape. The spaces between the members 72 provide an advantage over an ordinarily unbroken drum surface in that the spaces may engage and hold a clump of the material which has compacted in the hopper or which was not broken up when discharged from the receiver to insure that the clump is crushed or broken up to smaller pieces before delivery to the shredder means 60, and to insure that only measured amounts will pass therethrough. If the clumps or clods are exceedingly large so that the crushing thereof would cause an amount past that desired to be carried by a pick up element 42, the inclination of the conveyor 40 along with the crushing action of the drum means 71 insures that excess material will fall back to the bottom 16 of the hopper 17.

The drum means 71 is mounted on a drum shaft 73 which is journally supported at each end in a pair of pivotable arms 74 pivoted from the frame or side walls as at 75. The pivotable arms 74 are yieldingly suspended by chain means 76 so that if an uncrushable object has accidentally passed through previous screening or other filtering means, the drum means 71 may be urged away from the conveyor 40 to allow the uncrushable object to pass thereunder.

The chain 76 is connected to a hook or other removable securing means 77 so that the drum means 71 and the pivotable arms 74 may be set or suspended a selected distance from the conveyor 40, depending upon the size of the lumps that it is desired to pass between the drum means 71 and the conveyor 40. Thus, the drum means 71 may be yieldingly urged away from the conveyor 40 but may not approach the conveyor 40 closer than the distance selected by the length of chain 76 which is engaged by hook means 77. While the drum means is shown as mounted and freely rotatable on the drum shaft 73, it is to be noted that the drum may be driven, if desired, at a speed the same as or different from the surface speed of the conveyor 40.

For certain types of shredder means or if it is desired to use a smaller shredder means, depending upon the volume delivered by the conveyor 40, it is desirable to dump the material carried by the width of the conveyor 40 at a selected dumping location above the shredder means 60. Although a chute may be provided for this purpose, a conveyor 50 transversely disposed with respect to the conveyor 40 is provided so that the material will not have an opportunity to clump, stick or clog in a chute. The use of a chute may be permissible, depending upon the material involved. In any event, the conveyor 50 acts to receive the material from the conveyor 40 and convey the material to a preferred dumping location above the shredder means 60.

While a hammer mill type shredder suitable for use with potting or flat soil is shown, it is to be noted that other processing means for shredding, mixing, aerating, screening or otherwise processing the material may be utilized, depending upon the material and the use to which the material is to be applied.

A loading or distributing conveyor 80 is provided in a shredder hopper 65 to deliver the material to the loading station indicated generally at 81. A cover and flange assembly 83 is provided over the end of conveyor 80 to prevent material being operated on by the shredder from being accidentally propelled from the shredder hopper 65 out past the loading station 81. As noted in FIGURE 6a starting switch 85 is provided to connect a power supply 86 to a hammer mill drive 87 and a conveyor drive 89. In order to permit the hammer mill drive 87 to place the hammer mill or shredder means 60 in full operation before material is dumped thereon, a delay unit 88 is interposed between the conveyor drive 89 and the starting switch 85. As hereinbefore discussed mechanical or other equivalents of the electrical circuit shown in FIGURE 6 may be utilized, for example, a clutching arrangement in which the conveyor drive is engaged after the hammer mill drive is engaged and fully operative.

Figure 2:
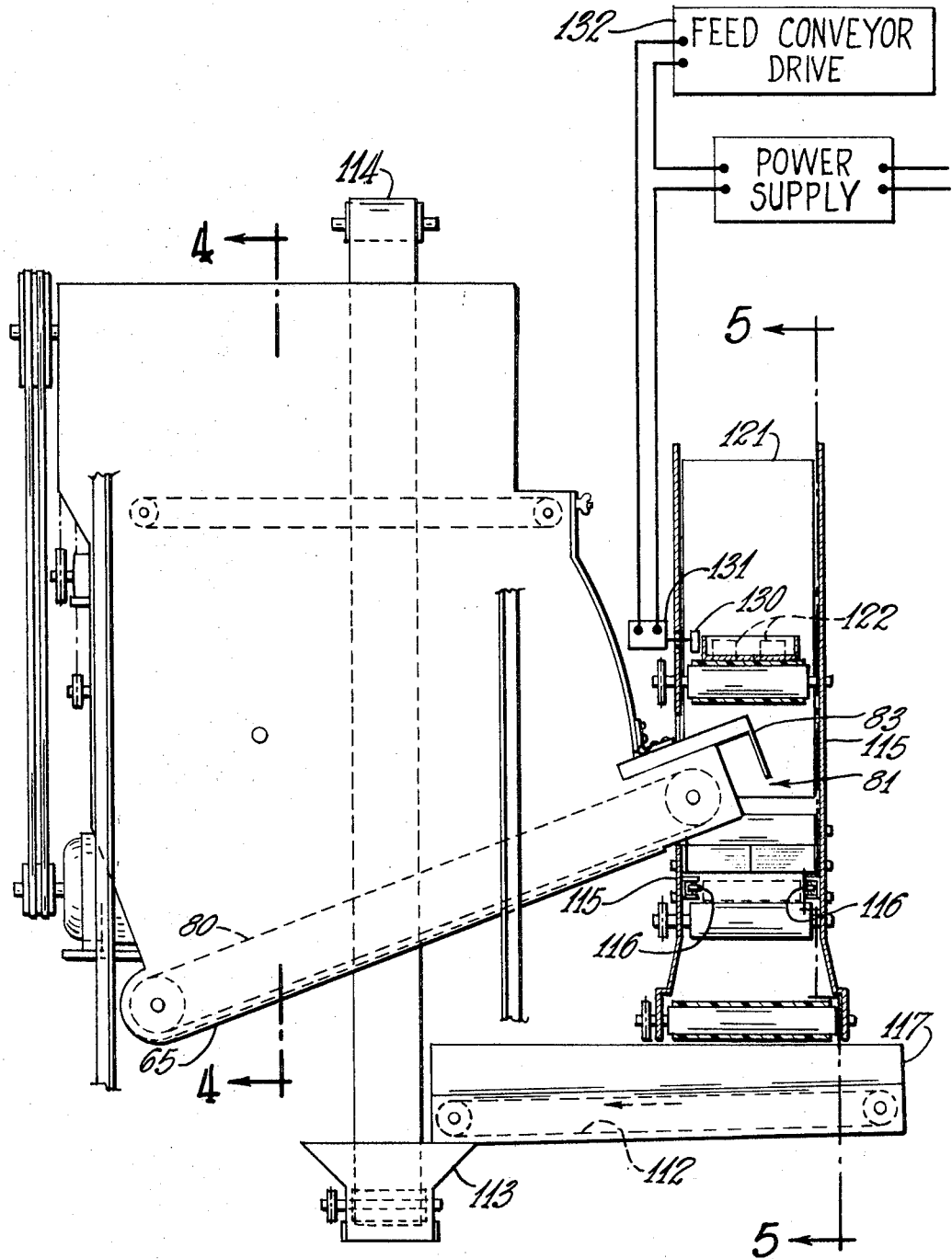
FIGURE 2 is an end view of the apparatus of FIGURE 1 taken from the left side along with an end view, partially in section, of loading apparatus shown in FIGURE 5.

Referring to FIGURE 2 and 5 there is illustrated loading and distributing means indicated generally at 90. A material-container or work-piece conveyor 100 is adapted to convey containers 101 past loading station 81 to receive material from loading conveyor 80. The rate of movement of the container 101 past the loading station 81 relative to the volume of material delivered by the conveyor 80 is such that material in excess of the capacity of each container is delivered to the container. The containers shown in this instance are flats, that is boxes in which seedlings are planted in potting soil to attain a desired growth before transplanting into gardens, etc. The flats are generally of lightweight relatively flimsy material such as pine or plastic, or pine boxes with individual plastic inserts therein so that the conveyor 100 is advantageously constructed from power driven rollers 102. The power driven rollers 102 preferably have rubber coatings or other suitable similar surfaces 103 which will frictionally engage the bottoms of containers 101 to move them along. However, since this is not a positive engagement means, the flats or containers 101 will not be crushed or otherwise damaged if there is a jam up along the conveyor line or if flats are not immediately removed after they are filled and the exit or parking portion of the conveyor line 100 is filled. The power drive for the rollers 102 is not shown in detail, but any suitable power connection may be provided by one skilled in the art.

A scraper or leveler 105 is disposed above containers 101 at a point after the containers have been filled. The scraper 105 illustrated herein is of a V-shape so that excess over-fill may be pushed to each side of the containers 101 to insure that all of the container 101 is filled with material. The V-shaped scraper or leveler 105 also advantageously divides the over-fill material above the container 101 so that the weight of the material being removed will not nonuniformly compact the material remaining in the container 101.

Depending upon the degree of compression and/or density desired or required of the material in a container 101, the scraper 105 may be spaced (a) a considerable distance above the container 101, (b) just above the container 101, or (c) at a position intermediate the positions (a) and (b). For most applications of potting soil in flats it is desired that some compaction be attained. For example, a spacing of one-half inch between the scraper 105 and the container 101 is suggested to leave a desired amount of excess over-fill for further compacting.

Further compacting may be accomplished by one or more compression rollers 106, 107 which are disposed downstream of the conveyor from the leveler or scraper 105. As noted in the drawings, compression roller 106 is spaced above the container 101 approximately one-half the distance of the spacing between scraper 105 and container 101. Compression roller 107 is spaced just above the container 101 to complete the compaction or compression desired while insuring that excess material will not remain above the edges of the containers 101 to spill or accidentally be brushed out of the container later. As stated above, only one of the compression rolls may be utilized or a series of compression rolls may be utilized depending upon the amount of compaction desired and the amount of over-fill to be compacted into the containers 101.

In order to maintain a clean area of operation and to prevent loss of the pretreated or already conditioned material means for catching the removed over-fill and returning the over-fill to the receiver or to storage are provided as indicated generally at 110. An over-fill material conveyor 111 is disposed beneath the loading station and the container conveyor. The use of the spaced driven rollers 102 in the container conveyor 101 permits excess over-fill, as removed by the scraper 105 or compression rollers 106, 107, to fall therebetween into the over-fill conveyor means 111. The over-fill conveyor means 111 transports the material via an intermediate conveyor 112 to a hopper 113 where a lifting conveyor or elevator 114 returns the excess or over-fill material to receiver 11.

Wall means 115 adjacent the container conveyor 100 assists in directing the fall of the excess over-fill onto the over-fill conveyor. Means are provided for maintaining a space between the wall means 115 and a container 101 on container conveyor 100 to permit the fall of excess over-fill past the sides of the containers and through the rollers 102 onto the over-fill container 111. These means are illustrated at 116 in FIGURE 2 and may comprise rollers supported and spaced at intervals along the side wall means 115. The roller means 115 also serve to center the containers 101 on conveyor 100 and preferably are made of material that is yieldingly resistant to avoid crushing or otherwise injuring the flats 101. Wall means 117 similarly serves to prevent material from falling from conveyor 112.

So that one operator may take care of the entire apparatus disclosed herein from a single station a feed conveyor 120 is provided to feed containers 101 from a position at the loading station 81 onto the container conveyor 100. A slide means 121 inclined upwardly away and spaced from the end of the feed conveyor 120 a distance less than one-half the length of container 101 is provided. The slide 121 extends beneath the feed conveyor 120 and is adapted to direct containers 101 coming down the slide or inclined means 121 onto the container conveyor. Extensions of the wall means 115 may be utilized to prevent the containers from falling from the slide or inclined means 121. While the inclined means 121 is shown as a slide made from steel or other wear-resistant material it is to be noted that the inclined means may be freely rotatable and more closely spaced roller means for accomplishing the same object, or may be other equivalent mechanical means.

Means such as lugs or cleats 122 attached to the feed conveyor 120 are utilized for urging a container so that the leading edge thereof slides up the inclined means 121 until the trailing edge of the container falls from the feed conveyor 120 onto the inclined means 121. The lugs 122 are spaced along the conveyor 120 so that containers 101 will successively drop on inclined means 121 without interfering with previously fed containers. The lugs or cleats 122 may be made of such a length so that, when they turn around the terminal roller 123 of the conveyor 120, they will not touch or otherwise interfere with a container on inclined means 121. Further, the lugs or cleats need not extend across the entire width of the conveyor 120. Two or more spaced cleats may be utilized so that when the cleats turn over terminal roller 123 the cleats will pass into the interior of the containers 101 and will not touch the sides of the containers 101. This arrangement is illustrated in FIGURE 2.

In order to prevent a jam up of the containers 101 on inclined means 121 or container conveyor 100, a sensing means such as a limit switch with a sensor as indicated at 130 in FIGURE 2 may be disposed to sense the presence of a container on the inclined means 121. The sensing means 130 is operative to activate a switching means 131 which will interrupt the application of power, and thus the movement and operation thereof, to a feed conveyor drive 132 until the container conveyor is cleared and/or ready to receive another container 101 on the inclined means 121.

As noted hereinbefore, the apparatus indicated generally at 90 is applicable in other industrial situations in which the containers may be described generically as work-pieces which are placed on a feed conveyor at a single point, conveyed past a process or operation station, and removed at the same point by a single operator after the process or operation has been performed on the work-piece.

Figure 3:
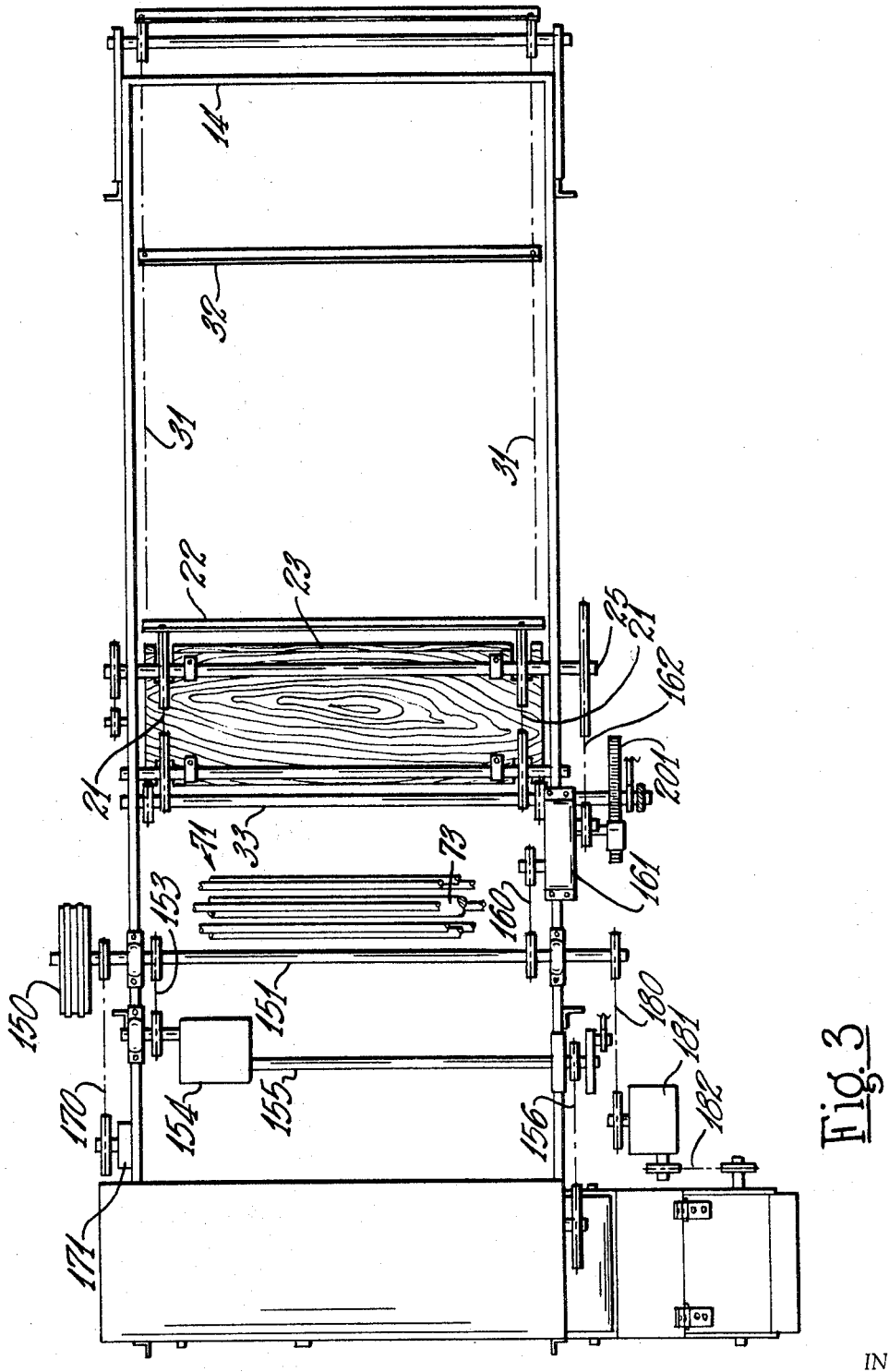
FIGURE 3 is a plan view of the apparatus illustrated in FIGURE 1.

Referring now particularly to FIGURES 1 and 3 the driving means for the various operations herein will be described. A shredder drive motor 87 as best shown in FIGURES 1 and 4 is connected via a belt and pulley system 140 to turn a drive shaft 61 of the shredder means 60.

The motive means for the material moving means of the apparatus is provided by conveyor drive motor 89. A belt and pulley arrangement 150 translates rotational power to a distribution shaft 151.

A chain and sprocket system 153 takes power from shaft 151 and through gear box 154, shaft 155 and a chain and sprocket system 156 drives conveyor 40. It is to be noted that where belt and pulley drives are described herein that chain and sprocket drives may be substituted therefor as full mechanical equivalent and vice versa. Endless chains or traveler means 21 receive their motive drive via chain and sprocket system 160 deriving power from distributor shaft 151, a gear box 161, and chain and sprocket system 162. The transverse dumping conveyor 50 receives its motive power from chain and sprocket means 170, gear box means 171, and chain and sprocket means 172. Loading conveyor 80 receives its motive power via chain and sprocket system 180, gear box 181 and chain and sprocket system 182.

Because the material in receiver 11 may have considerable weight and because it may be advantageous to advance the material periodically rather than continuously, a system as shown at 200 is provided for driving the material urging means 30. A ratchet wheel means 201 is mounted on and secured to power shaft 33 of conveyor 30. A pawl means 202 is provided for rotating the ratchet wheel 201. A lever system is provided for reciprocating the pawl 202 which includes a stroke length lever 203-fulcrum 204 arrangement. The fulcrum 204 is suspended from and journaled on shaft 205 which may be secured at selected positions in slot 206 formed in slot bar 207 which is secured in a spaced relationship from the frame on leg and feet assemblies 208 which are attached to the frame of the apparatus. The shaft 205 may have external threads formed thereon which in combination with lock nut assemblies will removably secure shaft 205 in selected positions within slot 206. Connecting bar 210 journaled on shaft 205 and power shaft 33 provides support and stability for the pivoting operation of stroke length lever 203 and fulcrum 204. A pitman rod 211 translates rotary motion from rotary member 212, fixedly secured to rotating shaft 155, so that force may be applied to the lever system 200.

The lever system 200 further includes bell crank means 213 connected in a linkage by connecting rods 214 and 215 between the stroke length lever 203 and the pawl 202 and multiplies the force applied to the pawl 202 since the horizontal arm of the bell crank is longer than the vertical arm thereof. A pawl means 220 prevents backward movement of the ratchet wheel 201 when the power pawl 202 is being reciprocated into a new power transmitting position. Both pawls 202 and 220 are spring loaded by springs 225, 226 to maintain the pawls in ratchet engaging position. Pawl 202 is retained adjacent to and in ratchet wheel engaging position by suspension from rod 216 journally supported upon power shaft 33.

There has thus been disclosed apparatus which, in the embodiment shown, is particularly suited for handling and processing potting soil, and which uniformly distributes the soil in containers at a desired density. The apparatus is operable by a single supervisor and is so constructed that the loading portion may continue to run, whether or not containers are in position to receive the soil, without losing any reconditioned soil or cluttering up the area In conclusion, it is to be noted that the embodiments disclosed and described herein are meant to be illustrative only and not limiting in any sense. The embodiments described serve merely to illustrate the spirit and scope of the invention.

I claim:

1. Apparatus for uniformly delivering compactable, discrete material comprising a receiver for holding a pile of said material and including floor means and elongated end barrier means extending generally upwardly from said floor means, said floor means and end barrier means defining a discharge port for said receiver adjacent the bottom of said end barrier means, said floor means including means for urging the pile of said material in said receiver toward said end barrier means and said discharge port, said upwardly extending elongated end barrier means being disposed along the side of said pile of material at a pitch angle substantially corresponding to the natural angle of repose of material in said receiver, said end barrier means including agitator means having elements projecting outwardly toward material in said receiver to engage a surface of the material and means for moving said elements with respect to the surface of the material.

2. Apparatus as defined in Claim 1 in which said agitator elements are carried by endless traveler means arranged to continuously move said elements in a path along said pitch angle in engagement with material in said receiver.

3. Apparatus as defined in Claim 2 in which said traveler means are endless chains and in which said elements are scrapers mounted on said chains.

4. Apparatus as defined in Claim 2 in which said end barrier means further includes barricade means mounted behind said agitator elements to prevent material in said receiver from falling out between said elements.

5. Apparatus as defined in Claim 1 in which said material urging means of said floor means comprises a conveyor means.

6. Apparatus as defined in Claim 1 in which said floor means includes a deck and said material urging means includes endless chains having their active runs mounted for movement above said deck, said chains carrying means for engaging the undersurface of material in said receiver.

7. Apparatus as defined in Claim 1 which further includes hopper means disposed to receive material from said discharge port, said material urging means traveling through said discharge port and above said hopper means, and means for removing material clinging to said material urging means for deposit in said hopper means.

8. Apparatus as defined in Claim 1 in which said end barrier means is pivotally mounted at one end thereof and which further includes means for removably securing the other end in preselected positions whereby the pitch angle of said end barrier means may be adjusted to substantially correspond with the angle of repose of the particular material in said receiver.

9. Apparatus for uniformly delivering compactable, discrete material comprising a receiver including floor means and end barrier means, said floor means and end barrier means defining a discharge port for said receiver adjacent the bottom of said end barrier means, said floor means including means for urging material in said receiver toward said end barrier means and said discharge port, said end barrier means being disposed at a pitch angle substantially corresponding to the angle of repose of material in said receiver, said end barrier means including agitator means having elements projecting outwardly toward material in said receiver to engage a surface of the material and means for moving said elements with respect to the surface of the material, and hopper means disposed to receive material from said discharge port, shredding means, and means for delivering material from said hopper means to said shredding means.

10. Apparatus as defined in Claim 9 in which said hopper means to shredding means delivery means includes conveyor means having one end disposed to pick up material from said hopper means and the other end disposed to deliver said material above said shredder means.

11. Apparatus as defined in Claim 10 in which said hopper means to shredding means conveyor means includes endless belt means carrying spaced and transversely mounted material pick up means for retaining measured amounts of material on said belt means as it leaves said hopper means.

12. Apparatus as defined in Claim 10 which further includes leveling means disposed a predetermined distance above said hopper means to shredding means conveyor to insure that no more than a predetermined amount is carried by said conveyor means.

13. Apparatus as defined in Claim 10 which further includes rotatable drum means disposed transversely to and a predetermined distance above said hopper means to shredding means conveyor means to crush compacted lumps of material carried on said conveyor means.

14. Apparatus as defined in Claim 13 in which said hopper means to shredding means conveyor means is inclined upwardly from said hopper means, and in which the pitch of said conveyor means combines with said rotatable drum means so that the crushing of a compacted lump of material results in the removal of excess material from said conveyor means.

15. Apparatus as defined in Claim 13 in which said drum means is mounted and freely rotatable on a drum shaft, said drum shaft being journaled at each end in a pivotably mounted arm so that the passage of an uncrushable object beneath said drum will merely urge said drum means away from said hopper means to shredding means conveyor means by the pivoting action of said arms.

16. Apparatus as defined in Claim 15 which further includes means for yieldingly suspending said pivotable arms and said drum means selected distances above said hopper means to shredding means conveyor means so that uncrushable objects may push said drum means away from said conveyor means but which will not allow said drum means closer than the selected distance.

17. Apparatus as defined in Claim 13 in which said drum means comprises a plurality of circumferentially spaced members defining a substantially cylindrical shape, the spacing between said members enabling said drum means to retain a compacted lump for crushing.

18. Apparatus as defined in Claim 10 which further includes means disposed transverse to the shredding means end of said hopper means to shredding means conveyor to divert material received from said conveyor to a selected dumping location above said shredder means.

19. Apparatus as defined in Claim 9 which further includes first means for driving said shredding means and second means for driving the material moving portions of said apparatus, starting means for said first and second driving means, and means for delaying the starting of said second driving means until said first driving means is in full operation.

20. Apparatus for uniformly delivering compactable, discrete material comprising a receiver including floor means and end barrier means, said floor means and end barrier means defining a discharge port for said receiver adjacent the bottom of said end barrier means, said floor means including means for urging material in said receiver toward said end barrier means and said discharge port, said end barrier means being disposed at a pitch angle substantially corresponding to the angle of repose of material in said receiver, said end barrier means including agitator means having elements projecting outwardly toward material in said receiver to engage a surface of the material and means for moving said elements with respect to the surface of the material, means for loading said material, loading station means comprising material-container conveyor means adapted to convey containers past a loading station to receive material, the rate of movement of a container past said loading station relative to the volume of material delivered to said station being such that material in excess of the capacity of each container is delivered to each container, and means spaced above said container conveyor for removing a predetermined amount of said excess over-fill.

21. Apparatus as defined in Claim 20 which further includes means for catching said removed over-fill and returning said over-fill to said receiver.

22. Apparatus as defined in Claim 21 in which said catching and returning means includes over-fill material conveyor means disposed beneath said loading station, said container conveyor comprising spaced driven rollers to permit excess over-fill to fall therebetween onto said over-fill conveyor means.

23. Apparatus as defined in Claim 22 which further includes wall means adjacent said container conveyor to direct the fall of said excess over-fill onto said over-fill conveyor.

24. Apparatus as defined in Claim 23 which further includes means for maintaining a space between said wall means and a container on said container conveyor to permit the fall of excess over-fill onto said over-fill container.

25. Apparatus as defined in Claim 20 which further includes means for compressing the material remaining in a container after said over-fill is removed.

26. Apparatus as defined in Claim 25 in which said compressing means includes roller means.

27. Apparatus as defined in Claim 20 in which said container conveyor comprises a plurality of driven rollers, each having a surface adapted to frictionally engage a container bottom for movement of said container along said conveyor to prevent crushing a container if jammed.

28. Apparatus as defined in Claim 20 which further includes means for feeding containers to said container conveyor comprising a feed conveyor disposed above said container conveyor, means inclined upwardly away and spaced from the end of said feed conveyor a distance less than one-half the length of a container, said inclined means extending beneath said feed conveyor and adapted to direct containers coming down said inclined means onto said container conveyor, and means attached to said feed conveyor for urging the leading edge of a container up said inclined means until the trailing edge of said container falls from said feed conveyor onto said inclined means.

29. Apparatus as defined in Claim 9 which further includes means for loading said material, loading station means comprising material-container conveyor means adapted to convey containers past a loading station to receive material, the rate of movement of a container past said loading station relative to the volume of material delivered to said station being such that material in excess of the capacity of each container is delivered to each container, and means spaced above said container conveyor for removing a predetermined amount of said excess over-fill.

30. Apparatus as defined in Claim 29 which further includes means for catching said removed over-fill and returning said over-fill to said receiver.

31. Apparatus as defined in Claim 29 which further includes means for feeding containers to said container conveyor comprising a feed conveyor disposed above said container conveyor, means inclined upwardly away and spaced from the end of said feed conveyor a distance less than one-half the length of a container, said inclined means extending beneath said feed conveyor and adapted to direct containers coming down said inclined means onto said container conveyor, and means attached to said feed conveyor for urging the leading edge of a container up said inclined means until the trailing edge of said container falls from said feed conveyor onto said inclined means.

32. Apparatus for uniformly delivering compactable, discrete material comprising a receiver including floor means and end barrier means, said floor means and end barrier means defining a discharge port for said receiver adjacent the bottom of said end barrier means, said floor means including means for urging material in said receiver toward said end barrier means and said discharge port, said end barrier means being disposed at a pitch angle substantially corresponding to the angle of repose of material in said receiver, said end barrier means including agitator means having elements projecting outwardly toward material in said receiver to engage a surface of the material and means for moving said elements with respect to the surface of the material, and means for driving said material urging means comprising a power shaft connected to drive said material urging means, ratchet wheel means mounted on said power shaft, pawl means for rotating said ratchet wheel, a lever system for reciprocating said pawl including a stroke length lever-fulcrum arrangement, said fulcrum being movable along said lever to adjust the length of said reciprocating stroke applied to said pawl means, and means for applying force to said lever system.

33. Apparatus as defined in Claim 32 in which said lever system further includes bell crank means connected in a linkage between said stroke length lever and said pawl means to increase the force applied to said pawl means.

34. Apparatus as defined in Claim 32 which further includes means for applying force to the lever system including pitman rod means for translating rotary motion derived from a motor into reciprocating motion.

35. Apparatus of the character described, in combination, inclined conveyor means for transporting conpactable material from a lower level to a higher level, said conveyor means including an endless belt having projecting cross pieces attached laterally across said belt for retaining material thereon, and rotatable drum means disposed transversely to and a predetermined distance above said conveyor means to crush compacted lumps of said material carried on said conveyor means the pitch of said conveyor means conbining with the crushing action of said rotatable drum means to remove excess material from said conveyor means by gravity back down the inclined conveyor means to provide a uniform feed by said conveyor.

36. Apparatus as defined in Claim 35 in which said drum means is mounted and freely rotatable on a drum shaft, said drum shaft being journaled at each end in a pivotably mounted arm so that the passage of an uncrushable object beneath said drum will merely urge said drum means away from said conveyor means by the pivoting action of said arms.

37. Apparatus as defined in Claim 36 which further includes means for yieldingly suspending said pivotable arms and said drum means selected distances above said conveyor means so that uncrushable objects may push said drum means away from said conveyor means but which will not allow said drum means closer than the selected distance.

38. Apparatus as defined in Claim 35 in which said drum means comprises a plurality of circumferentially spaced members defining a substantially cylindrical shape, the spacing between said members enabling said drum means to retain a compacted lump for crushing.

39. Apparatus of the character described, in combination, first work-piece conveyor means adapted to convey work-pieces past a process station for an operation at said station, second work-piece conveyor means disposed above and conveying in the opposite direction to said first work-piece conveyor means, means for receiving work-pieces from said second conveyor and directing said work-pieces to said first conveyor which includes slide means inclined upwardly away and spaced from the end of said second conveyor a distance less than one-half the length of a work-piece, said inclined slide means extending beneath said second conveyor and adapted to direct work-pieces coming down said inclined slide means onto said first work-piece conveyor, and means attached to said second conveyor for urging the leading edge of a work-piece up said inclined slide means until the trailing edge of said work-piece drops onto said inclined slide means permitting said work-piece to slide down said inclined means onto said first work-piece conveyor means, thereby requiring only one operator at said process station to provide work-pieces to said second conveyor which will then feed said first conveyor and to remove work-pieces from said first conveyor after said operation has been performed at said process station.

40. Apparatus of the character described, in combination, work-piece conveyor means adapted to convey work-pieces past a process station for an operation at said station, work-piece feed conveyor means disposed above said work-piece conveyor means, means inclined upwardly away and spaced from the end of said feed conveyor a distance less than one-half the length of a work-piece, said inclined means extending beneath said feed conveyor and adapted to direct work-pieces coming down said inclined means onto said work-piece conveyor, and means attached to said feed conveyor for urging the leading edge of a work-piece up said inclined means until the trailing edge of said work-piece drops onto said inclined means directing said work-piece onto said work-piece conveyor means, thereby requiring only one operator at said process station to provide work-pieces to receive said operation and to remove work-pieces after said operation, said work-pieces being containers and said process station being a station for loading material from storage means into said containers, the rate of movement of a container on said work-piece conveyor past said loading station relative to the volume delivered by the loading station is such that material in excess of the capacity of each container is delivered to the container, and which further includes means spaced above said container for removing a predetermined amount of said excess over-fill.

41. Apparatus as defined in Claim 40 which further includes means for catching said removed over-fill and returning said over-fill to the storage means.

42. Apparatus as defined in Claim 41 in which said catching and returning means includes over-fill material conveyor means disposed beneath said loading station, said container conveyor comprising spaced driven rollers to permit excess over-fill to fall therebetween onto said over-fill conveyor means.

43. Apparatus as defined in Claim 42 which further includes wall means adjacent said container conveyor to direct the fall of said excess over-fill onto said over-fill conveyor.

44. Apparatus as defined in Claim 43 which further includes means for maintaining a space between said wall means and a container on said container conveyor to permit the fall of excess over-fill onto said over-fill container.

45. Apparatus as defined in Claim 40 which further includes means for compressing the material remaining in a container after said over-fill is removed.